United States Patent
Binder et al.

(10) Patent No.: US 10,547,799 B2
(45) Date of Patent: *Jan. 28, 2020

(54) INFRARED DETECTOR WITH INCREASED IMAGE RESOLUTION

(71) Applicant: ELBIT SYSTEMS ELECTRO-OPTICS ELOP LTD., Rehovot (IL)

(72) Inventors: Shalom Binder, Rishon le Zion (IL); Dov Frieman, Rehovot (IL); Avishay Nachum, Rehovot (IL)

(73) Assignee: ELBIT SYSTEMS ELECTRO-OPTICS ELOP LTD., Rehovot (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/866,799

(22) Filed: Jan. 10, 2018

(65) Prior Publication Data

US 2018/0160056 A1 Jun. 7, 2018

Related U.S. Application Data

(63) Continuation of application No. 13/978,054, filed as application No. PCT/IL2013/050380 on May 5, 2013, now Pat. No. 9,894,292.

(30) Foreign Application Priority Data

May 13, 2012 (IL) .......................................... 219773

(51) Int. Cl.
  *H04N 5/33* (2006.01)
  *H04N 5/349* (2011.01)
(52) U.S. Cl.
  CPC ............... *H04N 5/33* (2013.01); *H04N 5/349* (2013.01)

(58) Field of Classification Search
  CPC ................................. H04N 5/33; H04N 5/349
  See application file for complete search history.

(56) References Cited

U.S. PATENT DOCUMENTS

| 5,371,369 A | 12/1994 | Kent |
| 5,712,685 A | 12/1998 | Dumas |
| (Continued) | | |

FOREIGN PATENT DOCUMENTS

| EP | 1198119 A2 | 4/2002 |
| GB | 2270230 A | 3/1994 |
| (Continued) | | |

OTHER PUBLICATIONS

Wang et al, "The effect of fill factor of infrared FPA sensor on microscanning imagery quality," Proceedings of SPIE, Jan. 10, 2005, pp. 417-424, vol. 5640.

(Continued)

*Primary Examiner* — Mainul Hasan
(74) *Attorney, Agent, or Firm* — Paul D. Bianco; Gary S. Winer; Fleit Intellectual Property Law

(57) ABSTRACT

An apparatus for increasing the resolution of at least one portion of a cryogenically cooled and vacuum-sealed infrared imaging detector including a two-dimensional detector array having a fill factor value, the portion of the array successively exposed to an image scene to acquire multiple infrared imaging samples of the scene, a masking filter having a single pattern, disposed between the array and the image scene and operative to reduce the fill factor value of the portion of the array by a fill factor reduction amount (FFRA), an optical element disposed between the masking filter and the image scene, a directional angle shifter for shifting an angle at which the imaging samples are directed onto the portion of the array thereby successively shifting the image scene relative to the portion of the array between (Continued)

each of the imaging samples by a shifting increment corresponding to the FFRA and a processor.

10 Claims, 7 Drawing Sheets

(56) References Cited

U.S. PATENT DOCUMENTS

| | | | | |
|---|---|---|---|---|
| 6,005,682 | A | 12/1999 | Wu et al. | |
| 9,894,292 | B2* | 2/2018 | Binder | H04N 5/349 |
| 2006/0038705 | A1 | 2/2006 | Brady et al. | |
| 2010/0182482 | A1* | 7/2010 | Tanaka | G09G 3/3611 |
| | | | | 348/333.12 |
| 2011/0279681 | A1* | 11/2011 | Cabib | G01J 5/06 |
| | | | | 348/164 |
| 2013/0050526 | A1* | 2/2013 | Keelan | H04N 5/2254 |
| | | | | 348/231.99 |
| 2013/0113921 | A1* | 5/2013 | Richards | G02B 27/46 |
| | | | | 348/135 |

FOREIGN PATENT DOCUMENTS

| | | | |
|---|---|---|---|
| GB | 2270230 A1 | 3/1994 | |
| WO | 98046007 A1 | 10/1998 | |
| WO | 2009156362 A1 | 12/2009 | |
| WO | WO-2009156362 A1 * | 12/2009 | G01J 3/02 |

OTHER PUBLICATIONS

Fortin et al, "Realization of a fast microscanning device for infrared focal plane arrays," Jan. 10, 1996, pp 185-196.

International Search Report (ISR) dated Aug. 14, 2013 for International Patent Application No. PCT/IL2013/050380 filed on May 5, 2013.

Written Opinion (WO) dated Aug. 14, 2013 for International Patent Application No. PCT/IL2013/050380 filed on May 5, 2013.

International Preliminary Report on Patentability for International Patent Application No. IPCT/IL2013/050380 filed on May 5, 2013.

* cited by examiner

INFRARED DETECTOR WITH INCREASED IMAGE RESOLUTION

FIELD OF THE DISCLOSED TECHNIQUE

The disclosed technique generally relates to infrared image detectors having a two-dimensional sensor array, and to image resolution enhancement.

BACKGROUND OF THE DISCLOSED TECHNIQUE

An infrared (IR) image detector forms an image by detecting radiation in the infrared portion of the electromagnetic spectrum from the imaged scene. A passive infrared detector operates by measuring the infrared radiation emitted by the sources, particularly thermal energy in the far infrared range, as opposed to active IR detectors which first illuminates the objects with IR radiation and then captures the reflections of the illuminations. The inherent spatial resolution of a detector with a two-dimensional matrix array is a function of the size and number of pixels within the array (the pixel density). For many types of image sensors, such as complementary metal-oxide-semiconductor (CMOS)-based or charge-coupled device (CCD)-based sensors, it is fairly straightforward to increase the resolution by adding more pixels within a fixed space and/or decreasing pixel size in the array. However, for IR sensors such an approach would be prohibitively difficult and expensive. Furthermore, IR detectors are prone to receiving scarce light (particularly with passive IR detectors), and usually requires manipulations or treatment in order to enhance the amount of radiation collected by the detector to enable effective imaging in the IR wavelength range.

U.K. Patent No. 2,270,230 to Hirose, entitled "Two dimensional image detector", discloses masking the pixels of a sensor array such that a subdivided region is imaged by each pixel. A mask is provided in opposition to a surface of the sensor array, where the mask includes windows having a smaller area than the array pixels. A mask shifter changes the positions of the windows at pitches smaller than those between the pixels. Light passing through the mask window and into each pixel in the sensor array is divided into a desired number of subdivisions as the mask changes position, thus increasing the spatial resolution of the image relative to the pixel size. The mask may be implemented via a metal mask or via electronic manipulation of a substance having polarizing characteristics, such as liquid crystals.

European Patent No. 1,198,119 to Parsons, entitled "Improved resolution for an electric image sensor array", discloses introducing a partially occluding mask/light source between the sensor array and the image. Resolution improvement is obtained by displacement between the array and the mask/light source and calculating grey scale values for the improved resolution from the different changes in the charges of the individual array sensors.

PCT Application Publication No. 98/46007 to Bone, entitled "Imaging system and method", is directed to improving the resolution of a charge coupled device having a two-dimensional array of light sensitive detector elements. Discrete areas of each detector element are sequentially masked with an apertured opaque mask chosen so as to allow for square (n×n) arrays of aperture elements for each detector and so that the apertures can be arranged as an embedded set which facilitate hierarchical refinement of the resolution.

U.S. Pat. No. 6,005,682 to Wu et al, entitled "Resolution enhancement by multiple scanning with a low-resolution, two-dimensional sensor array", is directed to high-resolution imaging with low-resolution two-dimensional imagers whose sensors are only a fraction of a selected pixel area. Sensors are stepped across an image with an optical or mechanical stepper to acquire an image at each sensor position. Multiple images are obtained from individual sensors, which have a sensed area substantially less than the area of the pixels of the sensor array. The rescanning is accomplished by movable mirrors or lenses that are disposed between an illuminated specimen and a sensor area.

U.S. Pat. No. 5,712,685 to Dumas, entitled "Device to enhance imaging resolution", is directed to improving resolution of a Focal Plane Array (FPA) image sensor with microscanning methodology. A mask having a checkerboard pattern of opaque and transparent areas is located in front of and adjacent to the FPA onto which an image of a scene is optically focused. The mask and FPA are displaced with respect to each other in a number of micro-steps that extend in the same direction as the columns/rows of the FPA grid. The micro-steps are of equal lengths and are each a fraction of the length of a detector element. Opaque areas of the mask progressively cover equal areas of detector elements in discrete steps for each micro-step movement in one direction at the same time as transparent areas of the mask progressively uncover equal areas of other detector elements for each discrete step. Outputs from the detector elements provide signals for sample slices of the scene for each micro-step, and an image of the scene is reconstructed from the signals.

SUMMARY OF THE DISCLOSED TECHNIQUE

In accordance with one aspect of the disclosed technique, there is thus provided an apparatus for increasing the resolution of a cryogenically cooled and vacuum-sealed infrared imaging detector. The apparatus includes a two-dimensional detector array of photosensitive pixels arranged in a matrix, a masking filter, optics, shifting means, and a processor. The detector array is successively exposed to an image scene, to acquire multiple imaging samples of the scene. The masking filter is disposed between the detector array and the focal plane of the image scene and is maintained at a fixed position with respect to the detector array. The masking filter reduces the region of the pixels collecting incident radiation from the image scene for each of the imaging samples, such that only a portion of each pixel area of the image scene is imaged onto the corresponding pixel of the detector array. The optics are disposed between the masking filter and the focal plane of the image scene, and direct the incident radiation onto the detector array through the masking filter. The shifting means successively shifts the optical path of the image scene relative to the masking filter, by a shifting increment equal to a fraction of the pixel width of the array pixels and corresponding to a fill factor reduction amount, to provide imaging of different sub-pixel regions in each of the imaging samples. The processor reconstructs an image frame having a resolution greater than the intrinsic resolution of the detector, by a factor defined by the fill factor reduction amount, from the acquired imaging samples. The masking filter may be integrated with the detector array. The masking filter may include configuring the detector array such that the photosensitive region of the pixels of the array is smaller than the potentially maximum photosensitive region of the pixels. The shifting means may shift the optical path of the image scene relative to the masking filter by repositioning the optics with respect to the masking filter and the detector array. The shifting means may alternatively shift the optical path of the image scene relative to the masking filter by repositioning the masking filter and the detector array with respect to the optics. The f-number of the detector optics may be decreased by a factor corresponding to the fill factor reduction amount. The detector may operate within the wavelength range of approximately 1-15 μm. The detector may be a thermal imaging detector.

In accordance with another aspect of the disclosed technique, there is thus provided a method for increasing the resolution of a cryogenically cooled and vacuum-sealed infrared imaging detector that includes a two-dimensional detector array of photosensitive pixels arranged in a matrix. The method includes the procedures of successively exposing the detector array to an image scene to acquire multiple imaging samples of the scene, and reducing the region of the pixels collecting incident radiation from the image scene for each of the imaging samples, such that only a portion of each pixel area of the image scene is imaged onto the corresponding pixel of the detector array. The method further includes the procedure of successively shifting the optical path of the image scene relative to a masking filter maintained at a fixed position with respect to the detector array, by a shifting increment equal to a fraction of the pixel width of the array pixels and corresponding to a fill factor reduction amount, to provide imaging of different sub-pixel regions in each of the imaging samples. The method further includes the procedure of reconstructing an image frame having a resolution greater than the intrinsic resolution of the detector, by a factor defined by the fill factor reduction amount, from the acquired imaging samples. The method may further include the procedure of decreasing the f-number of the detector optics by a factor corresponding to the fill factor reduction amount.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a method and apparatus for increasing the intrinsic resolution of an infrared (IR) imaging detector without increasing the total size or the pixel density of the detector array. Instead, the effective spatial resolution of the IR detector is enlarged by reducing the active region within the individual pixels of the detector array (i.e., reducing the "fill factor"). Multiple imaging samples of the same image scene are acquired, in which only a portion of each pixel of the image scene is imaged onto the corresponding pixel of the detector array. The image scene is successively shifted relative to the detector array to provide imaging of different configurations of sub-pixel regions in each of the imaging samples. A higher resolution image frame is then reconstructed from the individual imaging samples.

Figure 1:
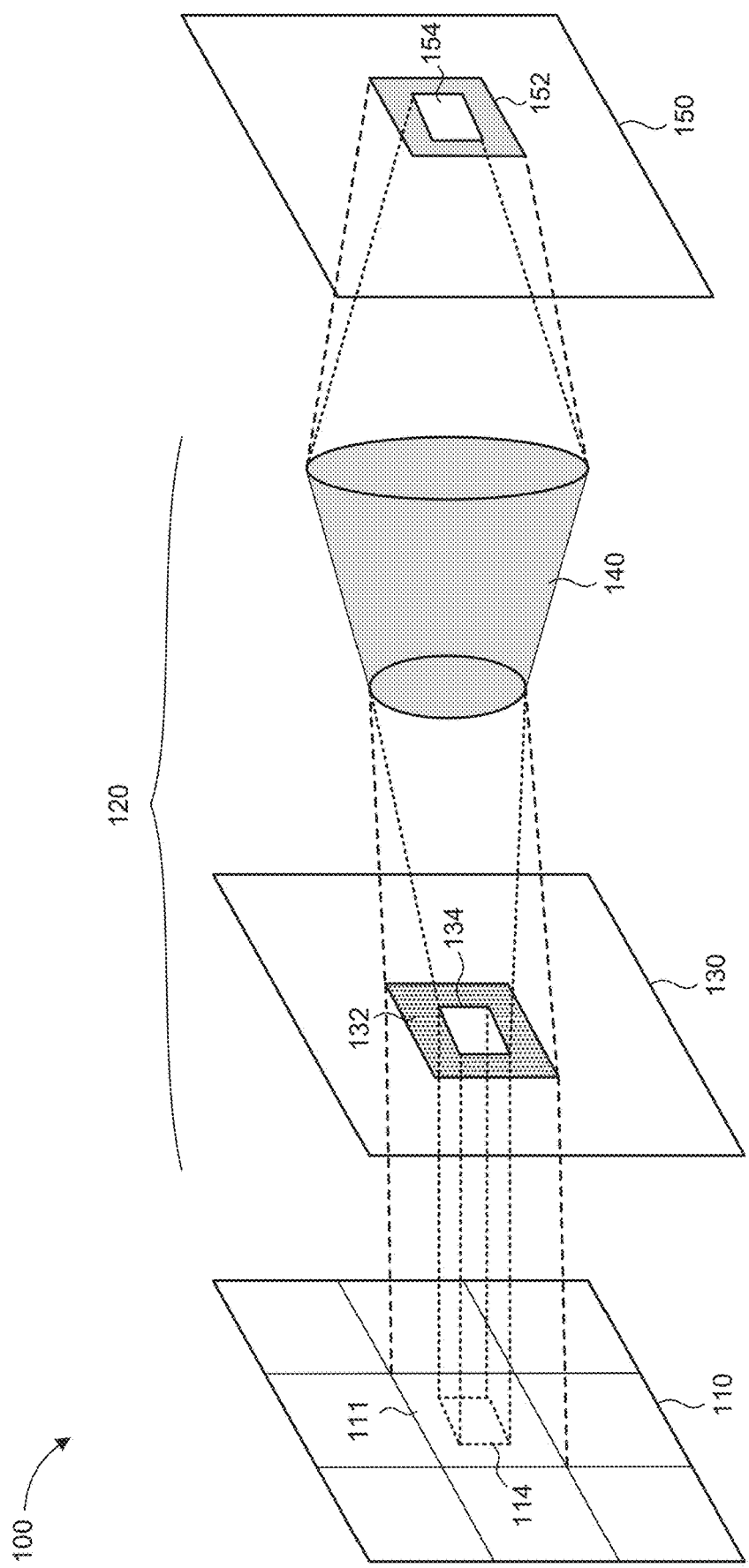
FIG. 1 is a perspective view schematic illustration of an apparatus for increasing the resolution of an infrared imaging detector, constructed and operative in accordance with an embodiment of the disclosed technique.

Reference is now made to FIG. 1, which is a perspective view schematic illustration of an apparatus, generally referenced 100, for increasing the resolution of an infrared imaging detector, constructed and operative in accordance with an embodiment of the disclosed technique. Apparatus 100 includes an IR detector array 110, and a fill factor reduction means 120 made up of a masking filter 130 and an optical element 140. Masking filter 130 and optical element 140 are disposed in between detector array 110 and the focal plane 150 of a scene to be imaged by the detector. Detector array 110 is made up of a lattice or matrix pattern of photosensitive pixels arranged in rows and columns (e.g., a 320×240 array, which includes 320 pixels along the array width and 240 pixels along the array height). The pixels in array 110 may be any suitable size or area, where the individual pixel size is generally substantially consistent across all pixels of the array. Fill factor reduction means 120 is operative to selectively reduce the active (i.e., photosensitive) region of the pixels of detector array 110, by masking or blocking a portion of the photosensitive region of the pixels from receiving radiation from the image scene, such that only a portion of the image scene pixel is imaged onto the corresponding detector array pixel. The active region and masked region of the pixels are then progressively shifted during subsequent imaging samples of the scene. In particular, optical element 140 projects an image region 152 of image plane 150 onto masking filter 130, which in turn blocks out a portion of image region 152 from reaching the corresponding pixel 111 of detector array while allowing only the remaining portion 154 of image region 152 to reach pixel 111. Consequently, pixel 111 includes an imaged region 114 that is less than the total area (i.e., potential photosensitive area) of array pixel 111. Masking filter 130 includes a masking region 132 and a non-masking region 134, such that radiation incident onto masking region 132 (via optical element 140) is prevented from passing through (toward detector array 110), while radiation incident onto non-masking region 134 is passed through. For example, masking region 132 may be embodied by a substantially opaque or non-transmissive portion of filter or a non-transmissive coating disposed at the required portion, whereas non-masking region 134 may be embodied by a substantially transmissive portion of filter 130, such as a window or opening thereat.

It is noted that any of the components of fill factor reduction means 120 may be fully or partially integrated with the IR imaging detector in accordance with the disclosed technique, or may be separate therefrom. For example, masking filter 130 may be situated within the housing enclosing the IR detector, while optical element 140 may be situated outside of the housing, provided optical element 140 and masking filter function to implement the aforementioned masking operation of the image plane 150 onto the detector array 110.

Figure 2A:
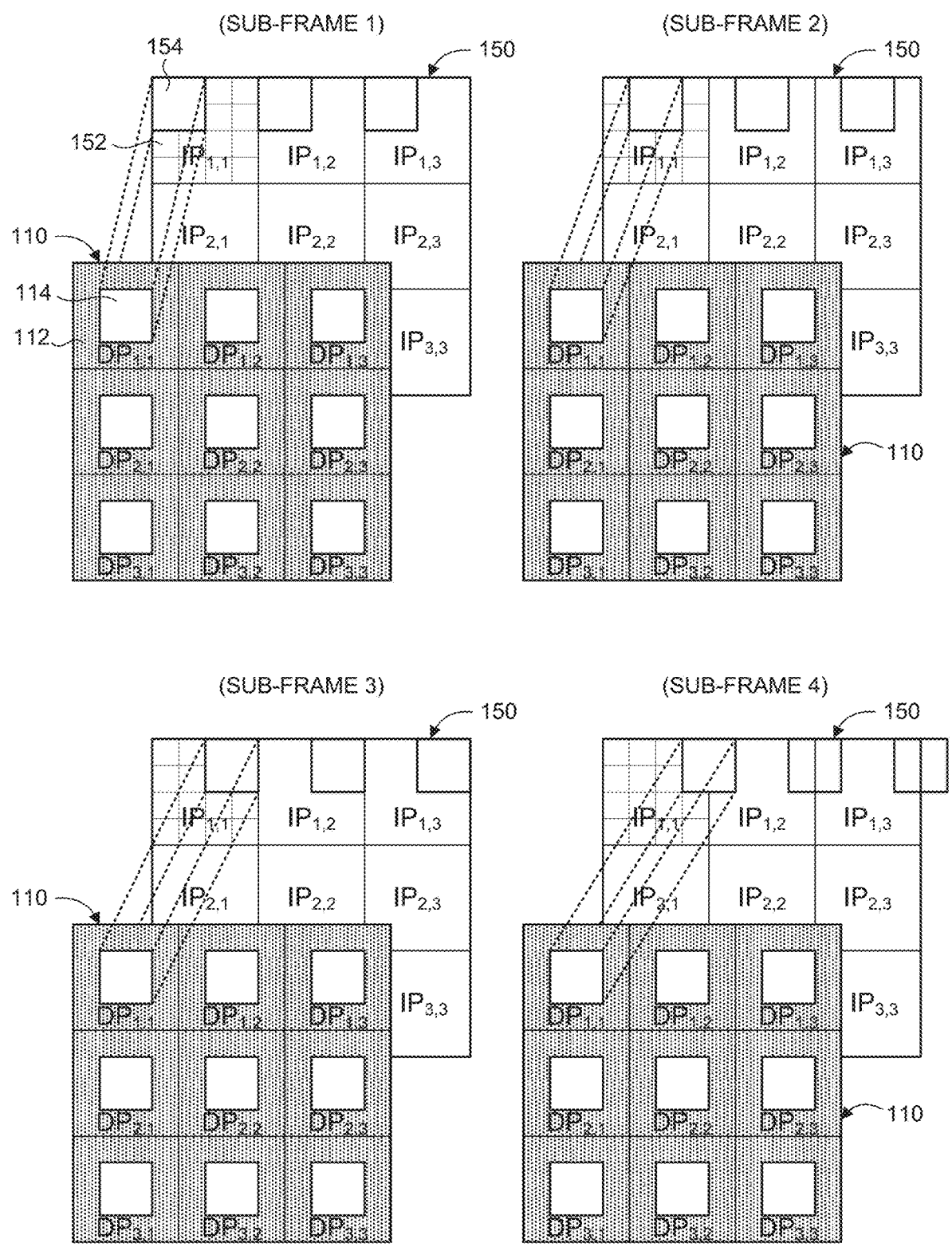
FIG. 2A is a perspective view schematic illustration of an initial set of image sub-frames acquired over successive imaging samples with the apparatus of FIG. 1.
Figure 2B:
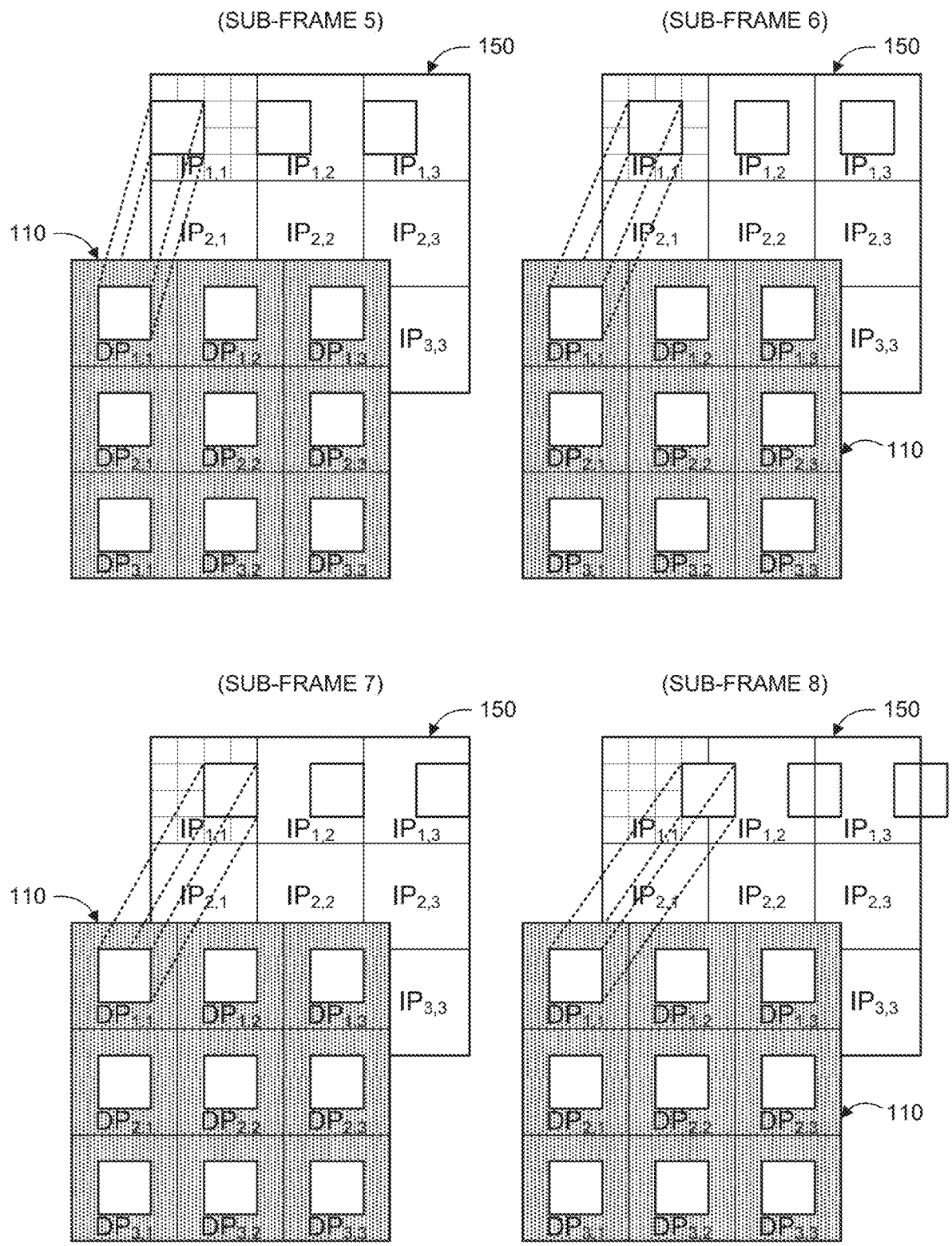
FIG. 2B is a perspective view schematic illustration of a subsequent set of image sub-frames acquired over successive imaging samples with the apparatus of FIG. 1.
Figure 2C:
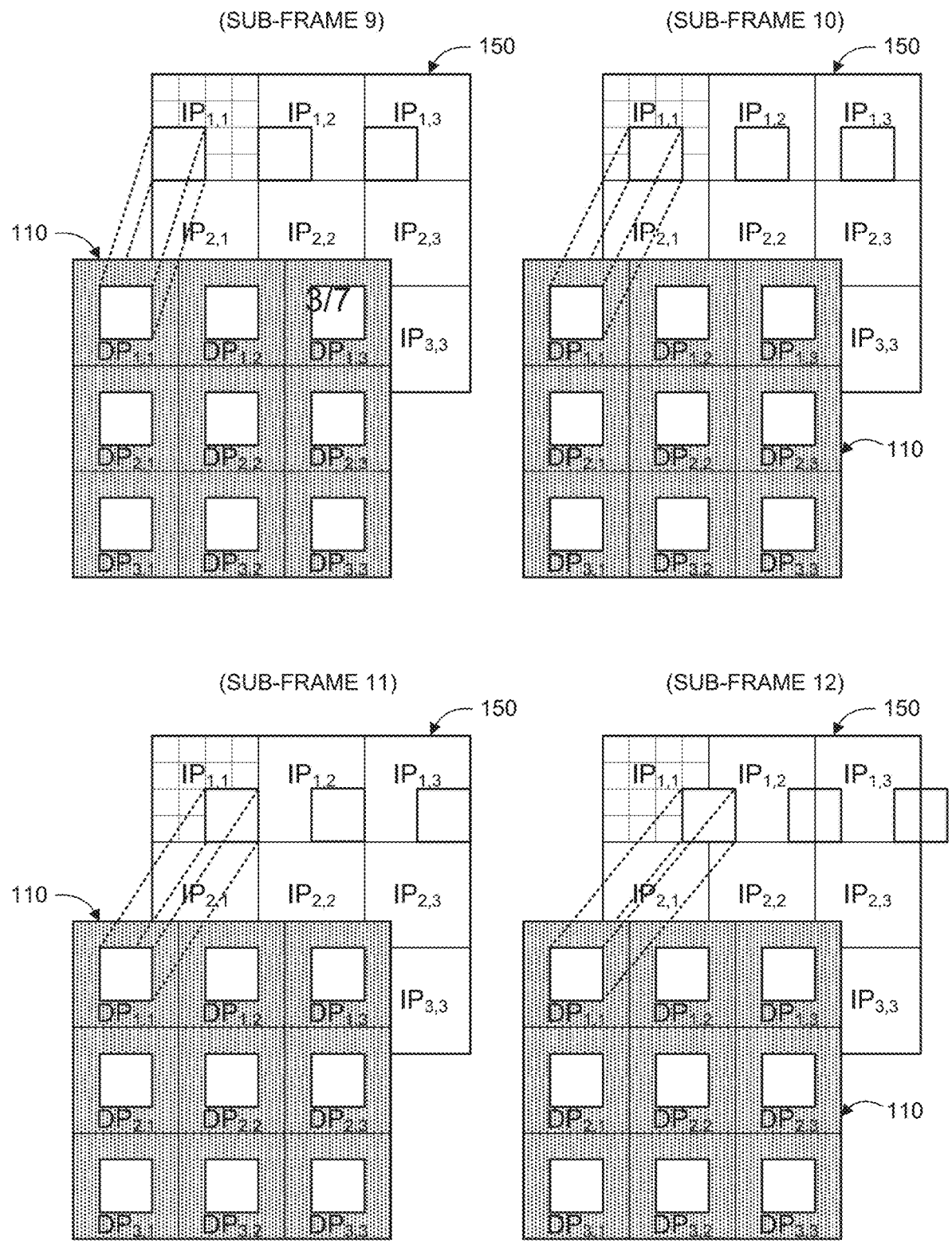
FIG. 2C is a perspective view schematic illustration of another subsequent set of image sub-frames acquired over successive imaging samples with the apparatus of FIG. 1.
Figure 2D:
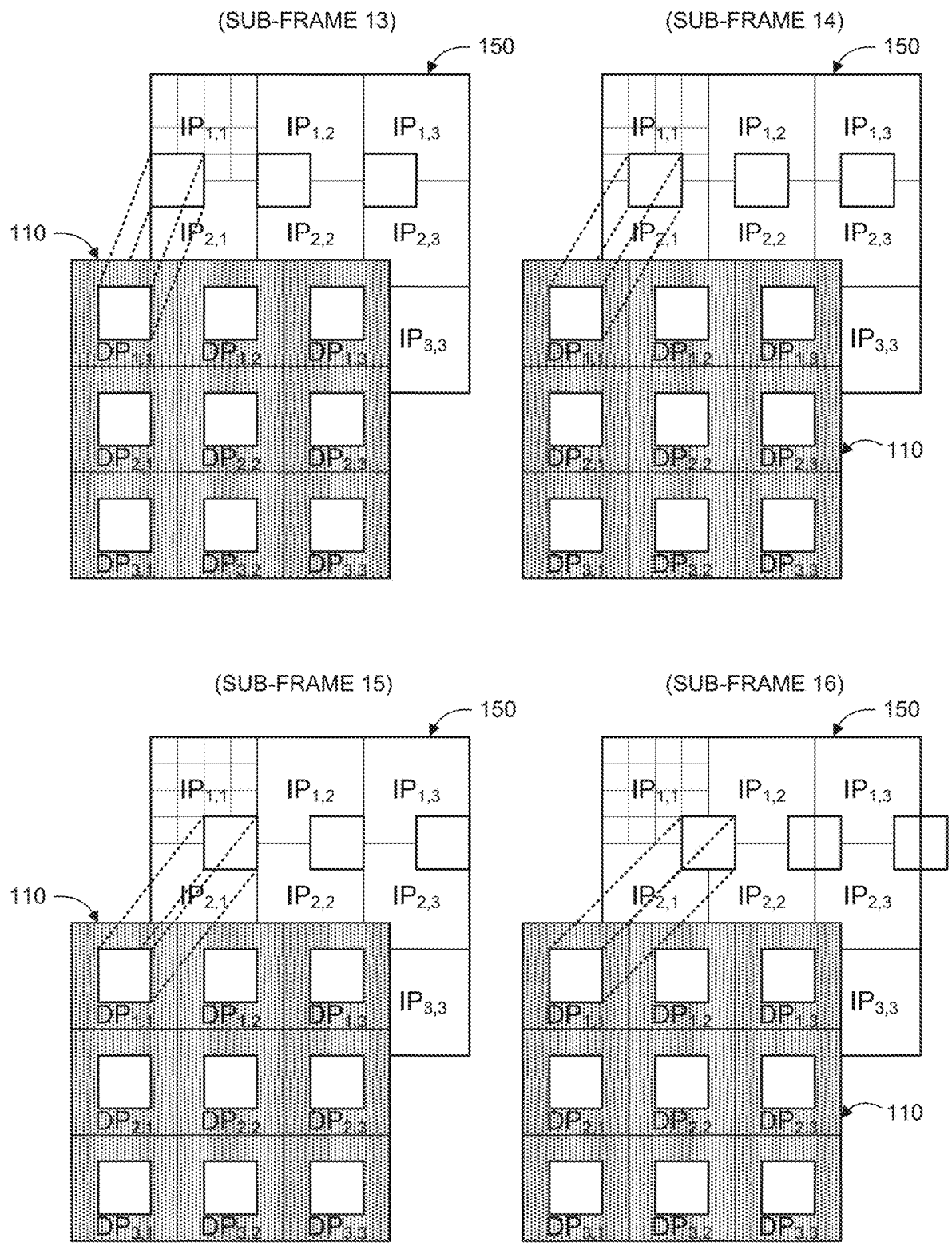
FIG. 2D is a perspective view schematic illustration of a final set of image sub-frames acquired over successive imaging samples with the apparatus of FIG. 1.

Reference is now made to FIGS. 2A, 2B, 2C and 2D. FIG. 2A is a perspective view schematic illustration of an initial set of image sub-frames acquired over successive imaging samples with the apparatus of FIG. 1. FIG. 2B is a perspective view schematic illustration of a subsequent set of image sub-frames acquired over successive imaging samples with the apparatus of FIG. 1. FIG. 2C is a perspective view schematic illustration of another subsequent set of image sub-frames acquired over successive imaging samples with the apparatus of FIG. 1. FIG. 2D is a perspective view schematic illustration of a final set of image sub-frames acquired over successive imaging samples with the apparatus of FIG. 1. Detector array 110 is depicted with nine (9) pixels arranged in a three-by-three (3×3) matrix. Masking filter 130 is disposed directly on array 110, and includes nine windows (i.e., non-masking regions 134) situated on a sub-region of each of the detector pixels ($DP_{x,y}$) of detector array 110, while the remaining area of masking filter 130 is made up of masking regions 132. The image plane 150 is similarly divided into nine image pixels ($IP_{x,y}$) arranged in a three-by-three (3×3) matrix (i.e., each image pixel representing the region of image plane 150 that would ordinarily be projected onto a corresponding detector pixel during regular image acquisition).

A first set of sub-frames of image scene 150 is acquired in FIG. 2A. The light (IR radiation) emitted from image scene 150 is directed toward detector array 110 through masking filter 130 via optical element 140 (not shown), such that only the radiation passing through the windows 134 of masking filter 130 reaches detector array 110. In particular, each detector pixel of detector array 110 captures a portion of a corresponding image pixel of image plane 150. For example, referring to the first imaging sample ("sub-frame 1") in FIG. 2A, radiation corresponding to an upper-left corner image pixel ($IP_{1,1}$) is directed toward a detector pixel ($DP_{1,1}$) situated at the upper-left corner of detector array 110. A portion of the radiation (154) passes through the masking filter window and is incident onto the a sub-region 114 of detector pixel $DP_{1,1}$. The rest of the radiation (152) from image pixel $IP_{1,1}$ is blocked by the masking region 132, such that it does not reach detector pixel $DP_{1,1}$. Consequently, detector pixel $DP_{1,1}$ includes an imaged region 114 and a non-imaged region 112. Similarly, the next image pixel ($IP_{1,2}$) in the top row of image plane 150 reaches detector pixel $DP_{1,2}$ after passing through the masking filter window, such that only a portion of image pixel $IP_{1,2}$ is incident onto a sub-region of detector pixel $DP_{1,2}$. Fill factor reduction means 120 is shown implementing an exemplary fill factor reduction of 25% (i.e., "25% FF"), denoting that each imaged region 114 occupies approximately one-quarter of the area of the respective pixel, while each non-imaged region 112 occupies an area of approximately three-quarters of the respective pixel. The remaining pixels ($DP_{x,y}$) of detector array 110 are imaged in an analogous manner during the first imaging sample (sub-frame), resulting in each detector pixel acquiring an imaged region 114 at its upper-left quadrant, while the remainder of the detector pixel is non-imaged.

Following acquisition of the first imaging sample, the portion of each image pixel imaged onto detector array 110 is shifted for the subsequent imaging samples. The shifting increment between each imaging sample is selected in accordance with the fill factor reduction amount, and is generally equal to a fraction of the pixel width (defined as the distance between the midpoint of adjacent pixels of the detector array). In this example, the fill factor reduction amount is 25% (25% FF), and so the shifting increment is also selected to be 25%, or approximately one quarter of the pixel width of the detector pixels. The shifting may be implemented by adjusting the line-of-sight of fill factor reduction means 120 relative to detector array 110 (e.g., by suitable adjustment of masking filter 130 and/or of optical element 140). Referring to the second imaging sample ("sub-frame 2") in FIG. 2A, each detector pixel $DP_{x,y}$ receives incident radiation from another portion of image pixel $IP_{x,y}$, such that the imaged region 114 corresponds to an upper-middle quadrant of the corresponding image pixel $IP_{x,y}$ (e.g., the imaged quadrant of "sub-frame 1" being shifted to the right by a quarter of the pixel width, such that the second image quadrant partially overlaps the first image quadrant). Referring to the third imaging sample ("sub-frame 3"), the line-of-sight is shifted again such that the imaged region 114 of each detector pixel $DP_{x,y}$ corresponds to an upper-right quadrant of the corresponding image pixel $IP_{x,y}$ (e.g., the imaged quadrant of "sub-frame 2" being shifted to the right by a quarter of the pixel width).

Additional imaging samples are acquired in an analogous manner, covering remaining overlapping portions (e.g., quadrants) of each image pixel, by successively adjusting the line-of-sight systematically over the same shifting increment (e.g., a quarter pixel width) along both the vertical axis and the horizontal axis of the image plane 150, applying a technique called "microscanning", known in the art. For example, referring to the fifth imaging sample ("sub-frame 5") in FIG. 2B, the line-of-sight is shifted downwards by the shifting increment with respect to the first imaging sample, such that the imaged region 114 of each detector pixel $DP_{x,y}$ corresponds to an middle-left quadrant of the corresponding image pixel $IP_{x,y}$ (e.g., the imaged quadrant of "sub-frame 1" being shifted downwards by a quarter of the pixel width). The remaining imaging samples ("sub frame 6" through "sub-frame 16") result in additional image pixel portions being acquired (i.e., imaging a respective portion that was not acquired in a previous sub-frame).

The line-of-sight alignment of fill factor reduction means 120 relative to detector array 110 may be successively shifted using any suitable mechanism or technique, in order to obtain the desired imaged sub-region on the detector pixels for each imaging sample. For example, masking filter 130 and detector array 110 remain in a fixed position, and thus the positions of masking regions 132 and non-masking regions 134 remain stationary, while optical element 140 is successively repositioned for each imaging sample to shift the directional angle at which optical element 140 directs the radiation from image scene 150. Alternatively, masking filter 130 and detector array 110 are jointly repositioned relative to optical element 140 (i.e., where masking filter 130 remains fixed with respect to detector array 110), for adjusting the optical path of image scene 150 for each imaging sample. It is noted that the actual size of the imaged regions on the detector pixels may be varied, such as by adjusting the characteristics of masking filter 130 (e.g., size, amount, and/or relative positions of non-masking regions 134) and/or adjusting the optical characteristics of optical element 140. In some detectors, such as vacuum-sealed detector and/or cryogenically-cooled detectors, it is very difficult to reposition a masking filter relative to the detector array, since the two components should be arranged as close as possible to one another. Consequently, a mechanism for repositioning a movable masking filter would need to be situated within the cryogenic storage dewar (vacuum flask) along with the masking filter and detector array. This requires such a mechanism to be exceptionally miniature and fast moving, while being capable of operating in cryogenic temperatures. Furthermore, the cryogenic storage dewar would require significant enlargement, as well as an enhanced cooling mechanism to support the additional heating load. Thus, even if the implementation of a movable masking filter is feasible, the aforementioned issues would yield a detector with minimal practical applications due to the resultant high cost, higher power consumption, greater volume, and lower reliability. Therefore, according to an embodiment of the disclosed technique, a stationary masking filter is maintained at a fixed position and orientation relative to the detector array, while the optical path of the image scene is successively adjusted relative to the stationary masking filter between imaging samples.

The different sub-regions of the image pixels $IP_{x,y}$ of image plane 150 may be imaged in any order or permutation. For example, a bottom row of image pixel portions may be imaged first (i.e., the four sub-frames depicted in FIG. 2D), followed by a higher row, and so forth; or alternatively, a first column of image pixel portions may be imaged in a first group of sub-frames, followed by an adjacent column, and so forth. Furthermore, the imaged sub-regions may be nonconsecutive within a given sub-frames (e.g., an upper-left quadrant and lower-right quadrant of the image pixel may be simultaneously acquired in one sub-frame, while an upper-right quadrant and lower-left quadrant of the image pixel are simultaneously acquired in a subsequent sub-frame).

Figure 3:
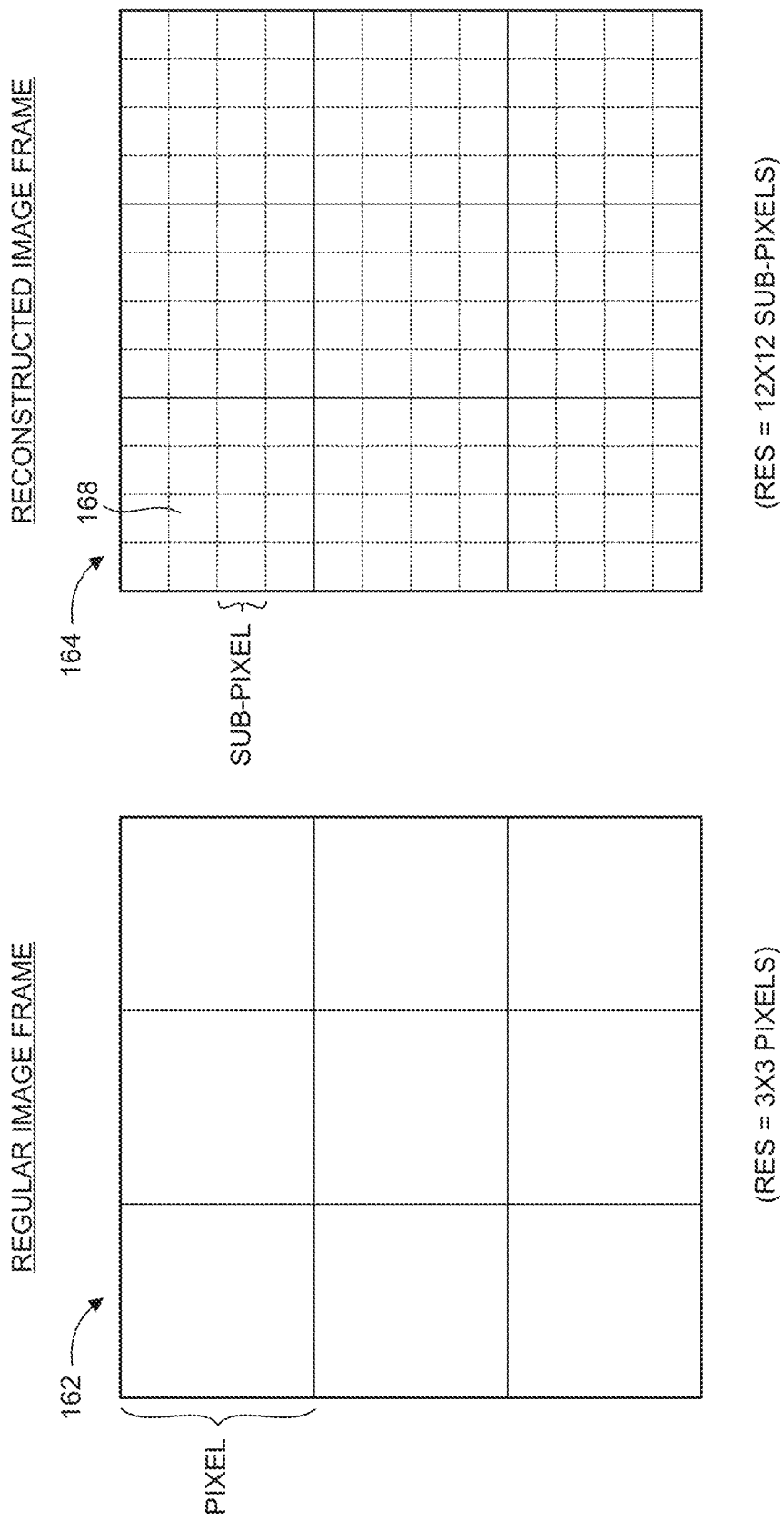
FIG. 3 is a schematic illustration of a reconstructed image frame, formed from the image sub-frames of FIGS. 2A, 2B, 2C and 2D, compared with a regular image frame of the imaging detector.

After all the sub-frames are acquired over successive imaging samples, where each individual sub-frame corresponds to a different imaged sub-region of each image pixel of image plane 150, a final image frame is constructed from all of the acquired sub-frames. Namely, all of the imaged sub-regions for each image pixel are processed and combined, in accordance with a suitable image processing scheme. Reference is now made to FIG. 3, which is a schematic illustration of a reconstructed image frame, referenced 164, formed from the image sub-frames of FIGS. 2A, 2B, 2C and 2D, compared with a regular image frame, referenced 162, of the imaging detector. Regular image frame 162 includes a total of 9 pixels (3×3), whereas reconstructed image frame 164 includes a total of 144 sub-pixels (12×12), providing a 16-fold increase in resolution (i.e., increasing the number of pixels by a factor of four along each of the horizontal and vertical axes). In particular, each individual pixel in reconstructed image frame 164 (corresponding to a pixel of image frame 162) is made up of 16 sub-pixels arranged in a 4×4 matrix. Each sub-pixel of reconstructed image frame 164 is formed from a combination of the respective sub-frames in which that sub-pixel was imaged. For example, sub-pixel 168 of image frame 164 is formed based on sub-frames 1 and 2 (FIG. 2A) and sub-frames 5 and 6 (FIG. 2B), in which that particular sub-pixel portion of image plane 150 was acquired (in different configurations).

Reconstructed image frame 164 represents a 16-fold increase in resolution with respect to image frame 162, which is an image frame that would result from regular imaging with detector array 110 (i.e., without application of the disclosed technique). The intrinsic resolution of detector array 110 is represented by a 3×3 pixel density (i.e., 3 rows by 3 columns of pixels=9 total pixels), as depicted in image frame 162, whereas reconstructed image frame 164 includes 12×12 sub-pixels within the same fixed area of array 110. As a result, the final image frame contains greater image detail (i.e., by a factor of sixteen) as compared to a standard image frame, as each pixel of the reconstructed image frame is made up of sixteen individual sub-pixels which provides four times the detail or information along each axis as would be contained in the corresponding pixel of the standard image frame.

It is appreciated that alternative resolution increase factors (i.e., the amount by which the image resolution is increased) may be obtained by varying the shifting increment between sub-frames, as well as the fill factor reduction amount (i.e., the amount by which the active region of the detector pixels is reduced). For example, to increase the image resolution by a factor of 9 (along each of the horizontal and vertical axes), then the shifting increment would be set to be approximately one-ninth (⅑) of the detector pixel width, while each imaging sample would image a sub-region occupying an area of approximately one-ninth (⅑) of the image pixels (i.e., corresponding to a fill factor reduction factor of ⅑ or approximately 11%). For example, a masking filter 130 having windows or non-masking regions 134 that are one-ninth (⅑) the size of the detector pixels, may be used to provide imaging of the desired image pixel sub-region size, instead of the masking filter 130 shown in FIGS. 2A-2D which includes windows that are one-quarter (¼) the detector pixel size. A total of 81 sub-frames would be acquired via microscanning (following a shifting increment of one-ninth (⅑) the detector pixel width between sub-frames), from which a final higher-resolution image frame can be reconstructed.

Figure 4:
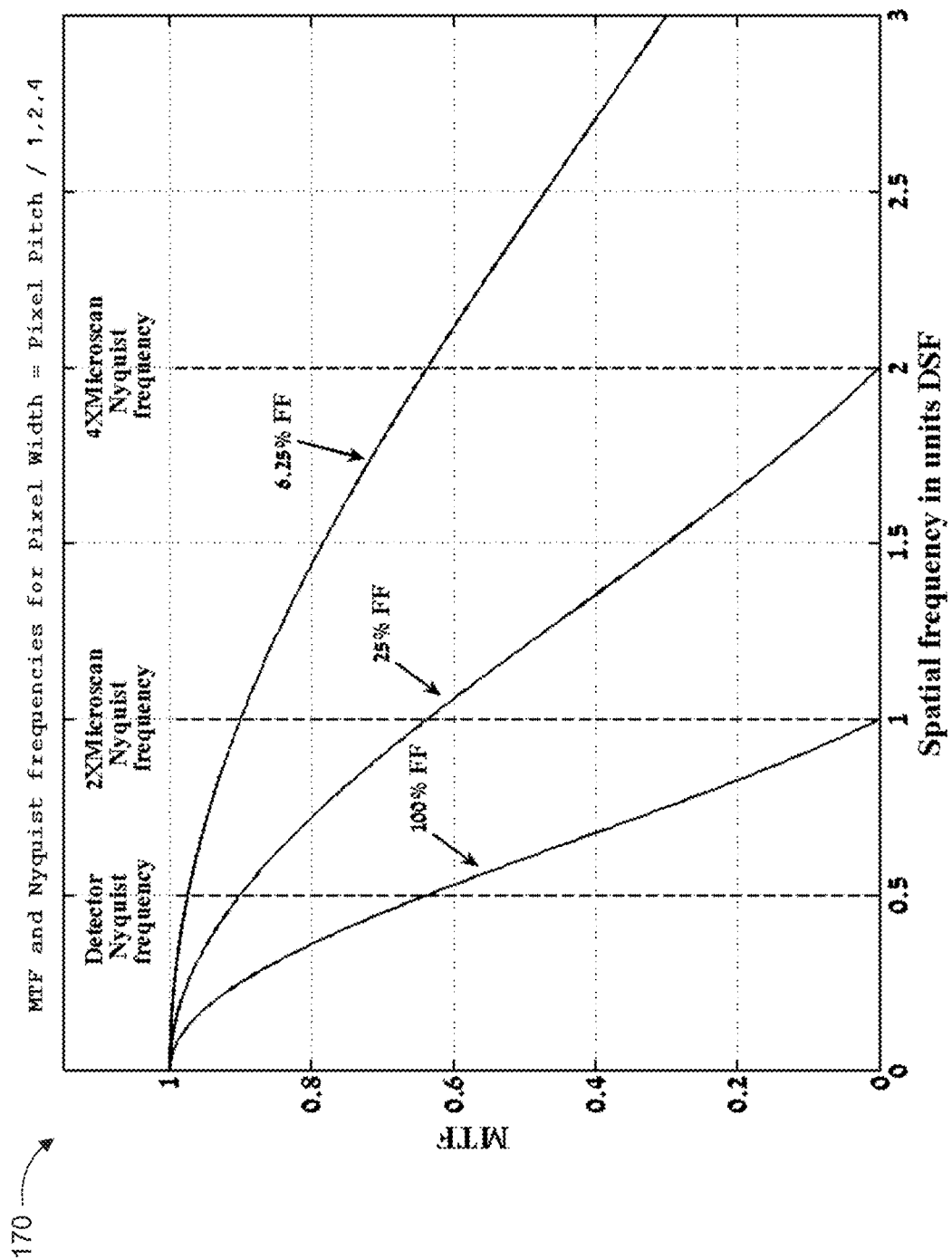
FIG. 4 is a schematic illustration of a graph showing Modulation Transfer Function (MTF) as a function of spatial frequency for different fill factor reduction amounts in accordance with the disclosed technique.

It is noted that the fill factor reduction of the detector pixels serves to reduce the overall detector sensitivity, as only a fraction of the entire radiation from the image scene reaches the detector array. To compensate for this effect, the f-number (also known as the "focal ratio", defined as the ratio between the entrance pupil diameter and the lens focal length) of the detector optics is decreased by a factor corresponding to the fill factor reduction amount (or to the shifting increment between imaging samples). Consequently, more radiation is received from the image scene, which offsets the reduction in received radiation resulting from the fill factor reduction. The f-number decrease also provides an improved optical Modulation Transfer Function (MTF), generally representing the ability the detector to distinguish between detail in the acquired image, thereby allowing the detector to support the enhanced spatial resolution of the reconstructed image frame. Thus, the disclosed technique enhances the performance of the IR imaging detector by essentially reducing the detector sensitivity (by reducing the fill factor) and compensating for this reduction by providing suitable detector optics that will provide an adequate level of overall sensitivity together with a substantially higher image spatial resolution Reference is now made to FIG. 4, which is a schematic illustration of a graph, generally referenced 170, showing Modulation Transfer Function (MTF) as a function of spatial frequency for different fill factor reduction amounts in accordance with the disclosed technique. Graph 170 depicts the detector MTF as a function of spatial frequency or "detector sampling frequency" (corresponding to a normalized representation of the spatial resolution). When implementing "regular microscanning" to increase the resolution of the detector (i.e., without reducing the fill factor of the detector pixels), then the resolution increase (additional information that can be derived from the image) is limited by the detector Nyquist frequency (where the Nyquist frequency equals half the pixel spatial sampling frequency). For example, when imaging without any fill factor reduction (i.e., "100% FF"), shifting between each microscan at increments of less than half the detector pixel pitch would not increase the overall image resolution beyond a factor of ×2 (since the MTF reaches zero beyond the "2× Microscan" frequency point on the graph, and is thus essentially unusable for imaging purposes). In contrast, when implementing microscanning in conjunction with fill factor reduction, then the spatial resolution of the detector image can be increased by a larger factor (i.e., not limited by the detector Nyquist frequency) while still deriving additional information from the image. For example, if the fill factor is decreased to 25% of the total active pixel area ("25% FF"), it is possible to microscan at shifting increments of up to ¼ of the detector pixel pitch (thereby increasing image resolution by ×4 along each axis=×16 total), while still being able to distinguish between the additional information (since the MTF is still above zero). By reducing the fill factor even further, it is possible to microscan at higher frequencies/smaller shifting increments to provide an even larger resolution increase. It is noted that the potential fill factor reduction amount (and thus the potential resolution increase) that can actually be implemented for a given imaging detector is generally limited by opto-mechanical design constraints. Such limitations in the ability to design and manufacture the suitable high resolution optics may vary according to particular system design and requirements.

Referring back to FIG. 1, fill factor reduction means 120 may be implemented using any suitable device, mechanism or technique operative for reducing the fill factor of the detector pixels by the desired amount. For example, fill factor reduction means 120 may alternatively be implemented by only a masking filter, which is successively repositioned and/or reoriented to obtain different imaging samples, or by only an optical element, which adjusts the optical path of the radiation from the image scene 150 over successive increments for each imaging sample. Further alternatively, fill factor reduction means 120 may be implemented by configuring detector array 110 such that the active (photosensitive) region of the pixels is less than the potentially maximum active region. For example, the pixels may be electronically configured such that only a selected sub-pixel region is active during each imaging sample.

The disclosed technique is applicable to all types of IR detectors, operative anywhere within the wavelength range of approximately 1-15 μm, encompassing LWIR, MWIR and SWIR wavelengths. The disclosed technique is particularly applicable to thermal imaging cameras, and particularly vacuum-sealed and cryogenically-cooled thermal imagers, where the term "cryogenically-cooled" as used herein encompasses different types of low-temperature detectors, including those operating at temperatures above what may be considered cryogenic temperatures under some definitions (for example, including temperatures between approximately −150° C. (123K) and approximately −120° C. (153K)).

In accordance with the disclosed technique, there is provided a method for increasing the resolution of an IR imaging detector comprising a two-dimensional detector array of photosensitive pixels arranged in a matrix. The method includes the procedure of successively exposing the detector array to an image scene, to acquire multiple imaging samples of the image scene, where for each imaging sample, the region of the pixels collecting incident radiation from the image scene is reduced such that only a portion of the pixel area of the imaged scene is imaged onto the corresponding pixel of the detector array. The method further includes the procedure of successively shifting the image scene relative to the detector array by a shifting increment equal to a fraction of the pixel width of the array pixels, to provide imaging of successive sub-pixel region in each of the imaging samples. The method further includes the procedure of reconstructing an image frame having a resolution greater, by a factor defined by the shifting increment, than the intrinsic resolution of the detector, from the acquired imaging samples.

It will be appreciated by persons skilled in the art that the disclosed technique is not limited to what has been particularly shown and described hereinabove.

The invention claimed is:

1. An apparatus for increasing the resolution of at least one portion of a cryogenically cooled and vacuum-sealed infrared imaging detector, comprising:
   a two-dimensional detector array of photosensitive pixels arranged in a matrix, said detector array having a fill factor value, said at least one portion of said detector array successively exposed to an image scene to acquire multiple infrared imaging samples of said scene, said detector array being operative within a wavelength range of 1-15 micrometers (μm);
   a masking filter, having a single pattern, integrated with said detector array and disposed between said detector array and said image scene, said masking filter operative to mask part of an active region of at least one of said photosensitive pixels, thereby reducing said fill factor value of said at least one portion of said detector array by a fill factor reduction amount, such that only a sub-region of a pixel region of said image scene is imaged onto a corresponding masked pixel of said at least one portion of said detector array;
   an optical element disposed between said masking filter and said image scene, said optical element positioned to direct said image scene onto said at least one portion of said detector array through said masking filter;
   a directional angle shifter for shifting an angle at which said imaging samples are directed onto said at least one portion of said two-dimensional detector array to thereby successively shift said image scene relative to said at least one portion of said detector array between each of said imaging samples by a shifting increment corresponding to said fill factor reduction amount and smaller than an unmasked active region of a masked photosensitive pixel, wherein at least one masked photosensitive pixel of said detector array receives partially over-lapping sub-regions in said imaging samples; and
   a processor, operative for reconstructing an image frame from said acquired imaging samples, the reconstructed image frame having, for at least one portion of it, a resolution greater than an intrinsic resolution of said at least one portion of said infrared imaging detector by a factor defined by said fill factor reduction amount;
   wherein said fill factor reduction amount is less than half of said pixel region thereby increasing said resolution above a Nyquist frequency of said two-dimensional detector array;
   wherein said masking filter reduces a sensitivity of said at least one portion of said two-dimensional detector array due to said fill factor reduction amount; and
   wherein an f-number of said optical element is selected in accordance with said fill factor reduction amount to compensate for said reduction in sensitivity of said at least one portion of said two-dimensional detector array.

2. The apparatus according to claim 1, wherein a number of said multiple imaging samples of said scene corresponds to said fill factor reduction amount.

3. The apparatus according to claim 1, wherein said directional angle shifter, when shifting, shifts an optical path of said image scene relative to said masking filter by repositioning said optical element with respect to said masking filter and said detector array.

4. The apparatus according to claim 1, wherein said directional angle shifter, when shifting, shifts an optical path of said image scene relative to said masking filter by repositioning said masking filter and said detector array with respect to said optical element.

5. The apparatus according to claim 1, wherein said infrared imaging detector is a thermal imaging detector.

6. The apparatus according to claim 1, wherein said shifting increment shifts said angle to nonconsecutive sub regions in said imaging samples.

7. The apparatus according to claim 1, wherein said directional angle shifter shifts said angle at which said imaging samples are directed onto said at least one portion of said two-dimensional detector array to nonconsecutive sub regions in said imaging samples.

8. A method for increasing the resolution of at least a portion of a cryogenically cooled and vacuum-sealed infrared imaging detector comprising a two-dimensional detector array of photosensitive pixels arranged in a matrix, said detector array being operative within a wavelength range of 1-15 micrometers (μm), said detector array having a fill factor value, said infrared imaging detector comprising detector optics, comprising the procedures of:

successively exposing said detector array to an image scene to acquire multiple infrared imaging samples of said scene;

reducing said fill factor value of said at least one portion of said detector array by a fill factor reduction amount by masking part of an active region of at least one of said photosensitive pixels for each of said imaging samples, via a masking filter, having a single pattern, integrated with said detector array, such that only a sub-region of a pixel region of said image scene is imaged onto a corresponding masked photosensitive pixel of said detector array, said masking filter reducing a sensitivity of said at least one portion of said detector array due to said fill factor reduction amount;

successively shifting said image scene relative to said at least one portion of said detector array between each of said imaging samples by a shifting increment corresponding to said fill factor reduction amount and smaller than an unmasked active region of a masked photosensitive pixel;

compensating for said reduction in sensitivity of said at least one portion of said detector array by selecting an f-number of said detector optics in accordance with said fill factor reduction amount; and reconstructing an image frame from said acquired imaging samples, the reconstructed image frame having, for at least one portion of it, a resolution greater than the intrinsic resolution of said at least one portion of said infrared imaging detector by a factor defined by said fill factor reduction amount, wherein at least one masked photosensitive pixel of said infrared imaging detector receives partially over-lapping sub-regions in said imaging samples; and wherein said fill factor reduction amount is less than half of said pixel region thereby increasing said resolution above a Nyquist frequency of said two-dimensional detector array.

9. The method according to claim 8, wherein said shifting increment shifts said image scene to nonconsecutive sub regions in said imaging samples.

10. The method according to claim 8, wherein said procedure of successively shifting said image scene relative to said at least one portion of said detector array between each of said imaging samples is towards nonconsecutive sub regions in said imaging samples.

* * * * *